US012300204B2

United States Patent

(12) United States Patent
Soudre et al.

(10) Patent No.: US 12,300,204 B2
(45) Date of Patent: May 13, 2025

(54) DIGITAL PIANO WITH REMOTE STORAGE

(71) Applicant: MEIJE, Le Versoud (FR)

(72) Inventors: Raphaël Soudre, Le Versoud (FR); Franck Bacquet, Le Versoud (FR)

(73) Assignee: MEIJE, Le Versoud (FR)

( * ) Notice: Subject to any disclaimer, the term of this patent is extended or adjusted under 35 U.S.C. 154(b) by 0 days.

(21) Appl. No.: 18/720,238

(22) PCT Filed: Dec. 9, 2022

(86) PCT No.: PCT/FR2022/052296
§ 371 (c)(1),
(2) Date: Jun. 14, 2024

(87) PCT Pub. No.: WO2023/111427
PCT Pub. Date: Jun. 22, 2023

(65) Prior Publication Data

US 2025/0054475 A1 Feb. 13, 2025

(30) Foreign Application Priority Data

Dec. 15, 2021 (FR) ...................................... 2113597

(51) Int. Cl.
*G10H 1/00* (2006.01)

(52) U.S. Cl.
CPC ......... *G10H 1/0041* (2013.01); *G10H 1/0008* (2013.01); *G10H 2220/221* (2013.01)

(58) Field of Classification Search
CPC ............... G10H 1/0041; G10H 1/0008; G10H 2220/221

(Continued)

(56) References Cited

U.S. PATENT DOCUMENTS 5,648,630 A * 7/1997 Vandervoort ............ G10H 1/22 84/645
2006/0272483 A1* 12/2006 Honeywell ............... G10F 1/02 84/609

(Continued)

FOREIGN PATENT DOCUMENTS

EP 1962277 A2 * 8/2008 ........... G06Q 20/102
KR 20210037054 A * 4/2021
WO WO-2023111427 A1 * 6/2023 ........... G10H 1/0008

OTHER PUBLICATIONS

International Search Report (PCT/ISA/210) with English translation mailed on Mar. 17, 2023, by the European Patent Office as the Internal Searching Authority for International Application No. PCT/FR2022/052296 (6 pages).

(Continued)

*Primary Examiner* — Christina M Schreiber
(74) *Attorney, Agent, or Firm* — Boone IP Law, PLLC

(57) ABSTRACT

A digital piano includes a keyboard, a speaker, a controller and a memory. The controller can control the digital piano in a live playing mode and in a deferred playing mode. In the live playing mode, the controller controls the speaker using a digital signal generated from a music playing signal from the keyboard, generates a deferred playing file from the music playing signal, and stores the deferred playing file in a remote storage portion of the memory. In the deferred playing mode, the controller receives a deferred playing file identifier, recovers the associated deferred playing file from the memory, and controls the speaker using a digital signal generated from the associated deferred playing file.

1 Claim, 2 Drawing Sheets

(58) Field of Classification Search
USPC ............................................................ 84/744
See application file for complete search history.

(56) References Cited

U.S. PATENT DOCUMENTS

| | | | | |
|---|---|---|---|---|
| 2007/0074622 | A1* | 4/2007 | Honeywell .............. | G10H 1/46 84/645 |
| 2015/0000506 | A1* | 1/2015 | Ye ............................ | G10G 1/02 84/609 |
| 2022/0238088 | A1* | 7/2022 | Danjyo .................... | G10H 1/34 |
| 2023/0290324 | A1* | 9/2023 | Isozaki ................ | G10H 1/0008 |

OTHER PUBLICATIONS

French Search Report mailed on Date Needed in French Patent No. FR2113597, issued by the French Patent Office and annexed to the issued patent published on Jun. 7, 2024 (with English translation (4 pages).
Decision to grant French Patent No. FR2113597, issued by the French Patent Office on May 25, 2024 (with English translation) (2 pages).
Preliminary Research Report and Written Opinion, with English translation, dated Jul. 18, 2022, by the French Patent Office in French Patent Application No. 2113597 (16 pages).

* cited by examiner

DIGITAL PIANO WITH REMOTE STORAGE

FIELD

The field of the invention relates to digital pianos, and more particularly those allowing playing back music that has been played before.

BACKGROUND

A digital piano is an electronic musical instrument equipped with a keyboard and allowing reproducing the sound of an acoustic piano. At the origin, the digital piano has been developed to be connected to an audio headset and thus avoid sound nuisances.

During the last decades, the digital piano has evolved to be provided with several functions, for example the integration of a metronome and of sound effects such as reverberation, the reproduction of sounds from other musical instruments, whether stringed instruments or percussion instruments, or the recording of pieces of music.

To enable the user to activate these functions, the digital piano is usually provided with a graphical interface comprising a screen, tactile or not, and a plurality of buttons.

Such an interface is often complex and has several drawbacks. In particular, the adjustment of the parameters of the digital piano requires either the user interrupting his/her playing on the keyboard to manipulate the graphical interface by himself/herself, or the intervention of a third-party likely to impede the user by his/her proximity.

Moreover, recording pieces of music is implemented locally, and therefore at the digital piano. The integrity of such a local storage might be threatened in the event of a technical failure or deterioration of the digital piano, so that the stored pieces of music could be lost definitively.

SUMMARY

The present invention improves the situation.

In this respect, the invention relates to a digital piano, comprising:

- a keyboard configured to generate a music playing signal,
- at least one speaker configured to produce a music sound signal,
- a controller configured to control the production of a music sound signal by the at least one speaker, and
- a memory accessible by the controller.

The controller is configured to control the digital piano at least according to a live playing mode and a playback mode.

The controller is configured, in the live playing mode, to control the at least one speaker with a digital signal generated from a music playing signal received from the keyboard, to generate a playback file from the music playing signal and enabling the deferred reproduction of said digital signal, and to store said playback file in a remote storage portion of the memory.

The controller is configured, in the playback mode, to receive a playback file identifier, to access the memory and retrieve the associated playback file therein, and to control the at least one speaker with a digital signal generated from the associated playback file.

The playback file allows reproducing, in the playback mode, a music sound signal already played in the live playing mode. Thus, a user could listen several times a music played on the keyboard of the digital piano. Moreover, the use of a remote storage allows preserving and recovering the playback file even in the event of a technical failure of the digital piano.

In one or more embodiment(s), the memory comprises a local storage portion. The controller is configured, in the live playing mode, to store the playback file in the local storage portion of the memory.

Advantageously, the controller is configured, in the playback mode, to determine whether the associated playback file is stored in the local storage portion of the memory from the playback file identifier, and, where appropriate, to retrieve the playback file in the local storage portion of the memory.

The local storage portion is more easily accessible than the remote storage portion. Thus, the digital piano may be found in an area in which the conditions of the network make access to the remote storage portion of the memory difficult and even impossible, in which case it is advantageous to be able to retrieve the playback file in the local storage portion. Such a possibility may be encountered in a concert hall having a particular isolation to mobile telephone networks. In general, even though the local and remote storage portions of the memory are accessible to the controller, it is faster for the latter to retrieve the playback file directly in the local storage portion.

In one or more embodiment(s), the controller is configured, in the playback mode, to retrieve in streaming the playback file in the remote storage portion of the memory.

Advantageously, the controller is configured, in the playback mode, to store the playback file retrieved in the local storage portion of the memory.

When the digital piano operates in the playback mode, it is likely that the used playback file is of particular interest to the user and is requested again by the latter. For a subsequent use, it might be interesting to keep the playback file in the local storage portion of the memory in order to avoid having to retrieve again the playback file in the remote storage portion, in particular if the conditions of access to the remote storage portion have been altered meanwhile.

Preferably, a time marker is associated with each playback file. The controller is then configured, in the playback mode, to store the retrieved playback file as a replacement for the playback file having the oldest time marker in the local storage portion of the memory when the local storage portion is full.

Indeed, it might be considered that the older a playback file, the less interest it will be to the user. The time marking of each playback file and the replacement of the oldest playback file with the retrieved playback file allow limiting the use of the remote storage portion.

In one or more embodiment(s), the keyboard comprises a plurality of keys, and the controller is configured to detect the press of a key of the keyboard and to measure an elapsed time without key presses. A music playing signal from which a playback file is generated is delimited by two time periods without key presses and having a duration longer than a predetermined duration.

The detection of pressing of a key allows generating playback files matching the practice of the user. Thus, each playback file corresponds in a consistent manner to a sequence of keys pressed by the user distinct from a preceding or next sequence.

In one or more embodiment(s), the controller is configured to control the digital piano according to a hybrid playing mode combining the live playing mode and the playback mode wherein the controller is configured to control the production of a music sound signal by the at least one speaker with a digital signal generated from a playback file associated with a received identifier and from a music playing signal received from the keyboard.

Four-hand piano is a specific piano-technique form which usually requires the intervention of two performers. The hybrid playing mode herein enables a user alone to play music which, normally, can be performed only with four hands. Thus, the user could first use the live playing mode to play a partition of the music with two hands. Afterwards, the user could select the generated playback file and control the reproduction of the corresponding music sound signal in the playback mode. The hybrid playing mode then enables him/her to play at the same time the other partition with two hands and to obtain the desired music. Thus, the digital piano operates according to both the live playing mode and the playback mode.

The invention also relates to a system for producing a music sound signal, comprising:

- a digital piano as described before, and
- a mobile terminal comprising a user interface and a processing unit, The user interface is configured to launch a mobile application via which a user can select a playback file.

The processing unit is configured to generate instructions comprising an identifier of the selected playback file, and emit the instructions to the digital piano for producing a music sound signal by the at least one speaker from the playback file associated with the identifier.

Thus, the mobile terminal forms a remote interface of the digital piano and enables a user to remotely control the digital piano. Thus, the digital piano may have a very simplified interface or not at all, which reinforces resemblance to an acoustic piano.

In one or more embodiment(s), the mobile application is accessible via a user account, and each playback file stored in the remote storage portion of the memory is associated with an identifier of a user account.

The user interface is configured to enable a user, via his/her user account, to authorise access to one or more playback file(s) associated with the identifier of his/her user account to a third-party user account.

After having played music on the keyboard of the digital piano, the user can share the associated playback file with another user who could thus control the production of the corresponding music sound signal, for example on another digital piano such as that one described before.

According to one or more embodiment(s), the user interface is configured to enable a user, via the mobile application, to select a sound volume level of the at least one speaker, and the processing unit is configured to generate instructions comprising said sound volume level, and to emit the instructions to the digital piano for controlling, by the controller, the sound volume of the at least one speaker to reach said sound volume level.

Thus, while a user plays on the keyboard of the digital piano, another user could remotely control the volume without having to be in the immediate proximity of the digital piano. Moreover, the user of the digital piano does not have to stop playing in order to modify the sound volume by himself/herself.

In one or more embodiment(s), the mobile terminal is configured to communicate with the digital piano via a local area network.

The mobile terminal could also communicate with the digital piano via a wide area network.

In such a case, the communication could transit via a remote server, acting as a remote storage portion of the memory. Such a communication comprises the playback identifier selected on the user interface. The playback file corresponding to the selected playback file identifier could then be retrieved directly in the remote storage portion and then transmitted to the digital piano controller.

The controller does not then need to verify beforehand whether or not the desired playback file is in the local storage portion of the memory since the playback file is directly received. Nonetheless, such a verification could be implemented later on in order to store, where necessary, the received playback file in the local storage portion. If the local storage portion is full, the playback file received from the remote server may replace a stored playback file. As detailed before, such a replacement may be performed while taking into account the time marker of each playback file to replace the oldest playback file of the local storage portion of the memory.

The invention also relates to a method, implemented by the previously-described system, for producing a music sound signal, comprising the following operations implemented by the mobile terminal:

- launching, on the user interface, the mobile application and selecting a playback file therein,
- generating, by the processing unit, instructions comprising an identifier of the selected playback file, and
- emitting said instructions to the digital piano, The method further comprises the following operations implemented by the controller of the digital piano in the playback mode:

- receiving the instructions comprising the playback file identifier,
- retrieving the associated playback file in the memory, and
- controlling the production of a music sound signal by the at least one speaker with a digital signal generated from the associated playback file.

The invention further relates to a computer program, comprising instructions for the implementation of the previously-described method, when the instructions are executed by at least one processor.

Finally, the invention relates to a non-transitory computer-readable storage medium storing the computer program.

BRIEF DESCRIPTION OF THE DRAWINGS

Other features, details and advantages will become apparent upon reading the detailed description hereinafter, and upon analysis of the appended drawings, wherein.

DETAILED DESCRIPTION

Figure 1:
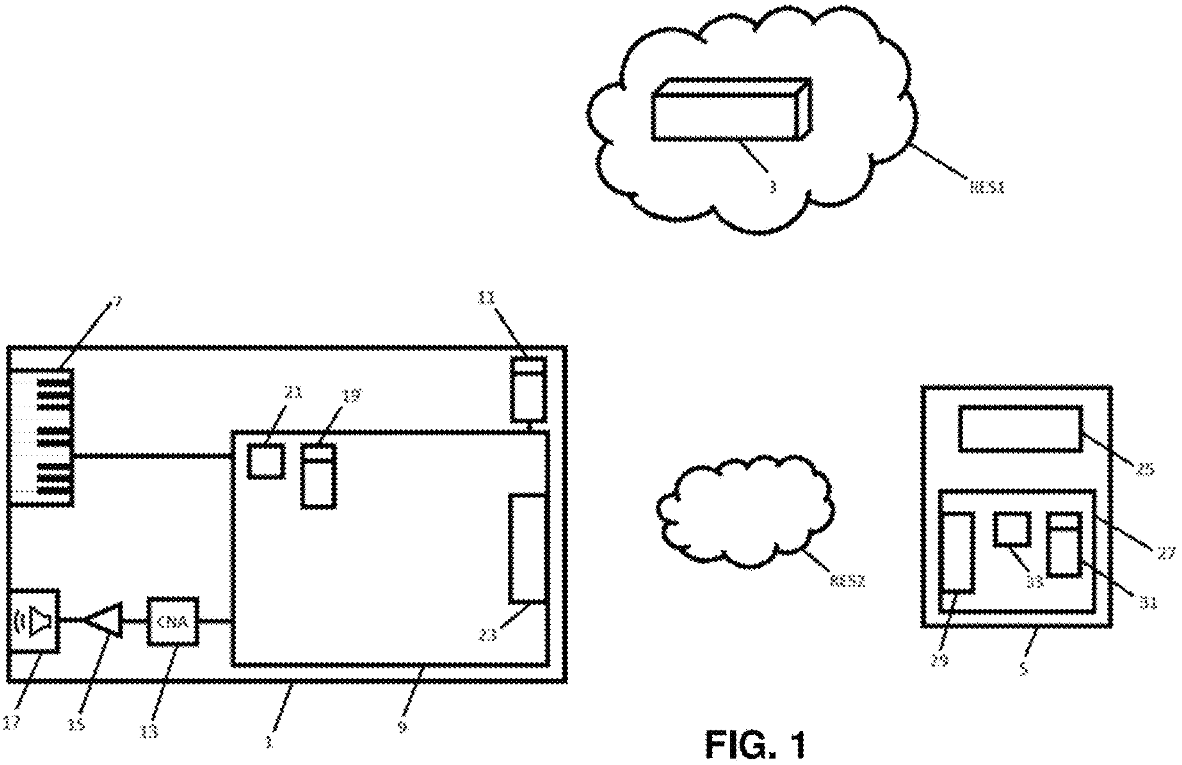
FIG. 1 schematically illustrates a digital piano according to the invention, a remote server and a mobile terminal.

FIG. 1 schematically illustrates a digital piano 1, a remote server 3 and a mobile terminal 5.

The digital piano 1 is an electronic musical instrument. Besides enabling a user to reproduce the sound of an acoustic piano, the digital piano 1 offers different functions, for example a metronome and sound effects such as reverberation, the reproduction of sounds of other musical instruments or the recording of pieces of music.

In the example illustrated in FIG. 1, the digital piano 1 comprises a keyboard 7, a controller 9, a memory 11, a digital-to-analog converter 13, an audio amplifier 15 and a speaker 17.

The keyboard 7 is configured to generate a music playing signal. The keyboard 7 comprises a set of keys which, when pressed by the fingers of a user, actuate a mechanism allowing initiating the production of a sound. The music playing signal may also be referred to as piano play.

Typically, the set of keys comprises a lower row of keys, often white, corresponding to the diatonic scale and an upper row of keys, often black, allowing obtaining the chromatic scale.

In order to reproduce the sensations of an acoustic keyboard as faithfully as possible, the keyboard 7 may comprise a hammer mechanism. Pressing or depressing a key cause lifting of a hammer which is mechanically coupled thereto and falls down under the effect of its own weight. The sensations may be improved with a mechanism with a mechanism with progressive hammers wherein the resistance of the keys increases as the user descends in the low notes. The keyboard 7 may also comprise a weighted spring mechanism wherein a spring is fastened to the end of each key and enables it to return to its initial position after pressing or depressing. Moreover, there are other mechanisms for actuating the keys of the keyboard 7.

As regards the production of sound, the digital piano 1 may operate according to a conventional sound sampling technology. Sound sampling consists in storing, within the digital piano 1, digital signal samples respectively associated with the keys of the keyboard 7. Thus, the keyboard 7 is configured so that pressing or depressing a key results in the remission of an electrical signal allowing establishing a correspondence with the corresponding digital signal sample. A set of one or more electrical signal(s) makes up a music playing signal. A given key of the keyboard 7 may also be associated with a combination of digital signal samples.

Moreover, it is known to a person skilled in the art that technologies other than sound sampling could be used to obtain a digital signal from a music playing signal.

The controller 9 is configured to control the operation of the digital piano 1. To do so, the controller 9 is connected, directly or not, to all of the electronic components of the digital piano 1.

In particular, the controller 9 is configured to control the digital piano 1 at least according to a live playing mode and a playback mode.

The live playing mode will be detailed with reference to FIG. 2, whereas the playback mode will be detailed with reference to FIG. 3.

In the embodiment illustrated in FIG. 1, the controller 9 comprises a memory 19, a processor 21 and a communication module 23. Nonetheless, the communication module 23 may be remote from the controller 9. For example, the communication module 23 is included in the digital piano 1 without being included in the controller 9.

The memory 19 is configured to store the implementation of which, by the instructions processor 21, results in the operation of the controller 9.

The memory 19 is typically a non-transitory computer-readable storage medium storing a computer program comprising the instructions intended to be executed by the processor 21.

Moreover, in the case where the digital piano 1 uses a sound sampling technology, each key of the keyboard 7 may be matched within the memory 19 with a digital signal sample or a combination of digital signal samples.

The controller 9 is configured to control the speaker 17 with a digital signal. When the controller 9 controls the digital piano 1 according to the live playing mode, the digital signal is generated from a music playing signal received from the keyboard 7.

More specifically, in the example illustrated in FIG. 1, the controller 9 is configured to control the speaker 17 via the digital-to-analog converter 13 and the audio amplifier 15.

The digital-to-analog converter 13 is configured to convert a digital signal generated by the controller 9 into an analog signal. More specifically, the digital signal generated by the controller 9 is a digital audio signal and the analog signal at the output of the digital-to-analog converter 13 is an analog audio signal.

The audio amplifier 15 is configured to amplify the analog signal emitted by the digital-to-analog converter 13 in order to obtain enough power to operate the speaker 17.

The speaker 17 is configured to produce a music sound signal. More specifically, the music sound signal is produced by the speaker 17 from an analog signal amplified by the audio amplifier 15.

In the example illustrated in FIG. 1, one single speaker 17 is shown. Nonetheless, the digital piano 1 may comprise a plurality of speakers. In addition, each speaker is typically accommodated in a loudspeaker to promote the emission of the music sound signal.

Finally, the controller 9 is configured to generate a playback file from the music playing signal received from the keyboard 7. For example, the playback file is an audio file storing at least the digital signal generated by the controller 9 from the music playing signal to control the speaker 17. In addition to the digital signal, the playback file may also comprise a voice signal.

Several different audio file formats may be used for the playback file. As examples, the playback file may thus be a WAV, AIFF, CAF, BWF or RIFF file.

The playback file enables the deferred reproduction of the digital signal. Thus, when the controller 9 controls the digital piano 1 according to the playback mode, the digital signal is generated from a playback file.

Moreover, the controller 9 may be able to detect pressing of a key of the keyboard 7 and to measure an elapsed duration without key presses. A music playing signal from which a playback file is generated could then be delimited by two consecutive time periods respectively having a duration longer than a predetermined duration and during which no key press is detected by the controller 9. The controller 9 may comprise an internal clock for determining the elapsed duration between two consecutive presses and enabling the controller 9 to identify a music playing signal. Each playback file generated by the controller 9 corresponds to a music playing signal thus identified. The predetermined duration typically lasts several seconds, for example 10 or 30 seconds. The predetermined duration may also be one minute or more.

This means that the controller 9 is able to determine when the user starts and ends a piece of music to efficiently generate playback files that are consistent with and faithful to the experience of the user.

The controller 9 is also configured to access the memory 11, whether to store or retrieve data therein. In particular, the memory 11 is configured to store a playback file generated by the controller 9. When the controller 9 controls the digital piano 1 according to a playback mode, the storage of a playback file allows playing again a music that has been played before.

Moreover, each playback file stored in the memory 11 is associated with a playback file identifier, also generated by the controller 9. Such an identifier facilitates, for the controller 9, the retrieval of the corresponding playback file.

Advantageously, a time marker is also associated with each playback file.

For example, the memory 11 is a cache memory, so that each playback file is stored therein temporarily.

Moreover, the controller 9 is configured to communicate at least with the remote server 3 and the mobile terminal 5. In the example illustrated in FIG. 1, the controller 9 comprises for this purpose the communication module 23.

The communication module 23 is configured to communicate with the remote server 3 via a wide area network RES1 (often referred to by the English acronym WAN, standing for "Wide Area Network"). For example, this wide area network RES1 is the Internet.

Thus, the communication module 23 is configured to enable the controller 9 to transmit each playback file to the remote server 3 to store it therein. In particular, the playback file is transmitted to the remote server 3 in association with the corresponding playback file identifier.

In the context of the invention, the mobile terminal 5 is used to remotely control the digital piano 1 and therefore forms a remote interface. For example, the communication module 23 and the mobile terminal 5 are set into communication via a local area network RES2 (often referred to by the English acronym LAN, standing for "Local Area Network"). For example, this network RES2 is a Wi-Fi network.

Hence, it should be understood that the communication module 23 is configured to communicate both via a wide area network and via a local area network.

In fact, the communication module 23 and the mobile terminal 5 may also be set into communication via the wide area network RES1. Thus, it is not necessary for the user of the mobile terminal 5 to be proximate to the digital piano 1, which could be controlled at a long distance.

The remote server 3 is configured to store each playback file generated by the controller 9 from a music playing signal received from the keyboard 7. Indeed, the remote server 3 is accessible to the controller 9 via the wide area network RES1 thanks to the communication module 23.

It should be understood herein that, in order to store the playback files, the controller 9 has a memory comprising at least one remote storage portion, herein corresponding to the remote server 3, and, advantageously, a local storage portion, herein corresponding to the memory 11. The memory 11 may be absent from the digital piano 1, in which case each playback file generated by the controller 9 is stored only in the remote server 3.

Moreover, each playback file is stored in the server 3 in association at least with the corresponding playback file identifier generated, at the digital piano 1, by the controller 9.

The mobile terminal 5 is configured to remotely control the controller 9 of the digital piano 1 and thus forms a remote interface. In other words, the mobile terminal 5 is a graphical interface enabling its user to control the digital piano 1 yet without having to be in the immediate proximity thereof. In fact, the digital piano 1 may comprise no local human-machine interface. It should be noted that the absence of such an interface on the digital piano 1 allows reinforcing resemblance to an acoustic piano.

The combination of the digital piano 1 and of the mobile terminal 5 forms a system for producing a music sound signal.

As illustrated in FIG. 1, the mobile terminal 5 comprises a user interface 25 and a processing unit 27.

The user interface 25 is configured to enable the user to launch a mobile application, which allows controlling the digital piano 1 remotely. For example, the mobile application is a native application downloaded and installed from an application store corresponding to the operating system of the mobile terminal 5. Alternatively, the mobile application may be a web application accessible via a web browser of the mobile terminal and therefore requiring neither downloading nor installation.

The mobile application enables the user to associate and synchronise the mobile terminal 5 and the digital piano 1. For example, the mobile application is accessible via a user account, and each playback file stored in the remote storage portion of the memory, i.e. the remote server 3, is associated with an identifier of a user account. In such a case, each playback file generated by the controller 9 is associated with a user account identifier and is stored within the remote server 3 in association with the corresponding user account identifier, in addition to the playback file identifier.

Hence, the user interface 25 is configured to enable the user of the mobile terminal 5, via his/her user account open on the mobile application, to access the remote server 3 and the playback files stored therein and which are associated with his/her user account identifier. The user can then select a playback file the corresponding music sound signal of which he/she wishes reproducing by the speaker 17 of the digital piano 1.

The mobile application may include a share option. The user interface 25 is then configured to enable the user of the mobile terminal 5, via his/her user account, to authorise access to one or more playback file(s) associated with the identifier of his/her user account to a third-party user account. Indeed, the remote server 3 may store playback files associated with different user accounts and transmitted by different digital pianos. Thus, this remote storage portion is shared by several users.

For example, the user interface 25 is a touchscreen or not.

The processing unit 27 is configured to control the operation of the mobile terminal 5. Besides launching the mobile application, the processing unit 27 is configured to generate instructions comprising the identifier of the playback file selected by the user via the user interface 25.

It should be noted that other instructions may be generated by the processing unit 27, still in the context of the remote control of the digital piano 1. For example, the user interface 25 is further configured to enable the user, via the mobile application, to select a sound volume level of the speaker 17. The processing unit 27 is then configured to generate instructions comprising the selected sound volume level.

The processing unit 27 comprises a communication module 29, a memory 31 and a processor 33.

As explained before, the mobile terminal 5 is configured to communicate both with the controller 9 of the digital piano 1 and with the remote server 3 to access the playback files that are stored therein. Consequently, the communication module 29 is configured to communicate both via the wide area network RES1 and via the local area network RES2.

The communication module 29 is configured to emit the instructions generated by the processing unit 27 to the digital piano 1. In particular, the communication module 29 allows emitting the instructions comprising the playback file identifier selected by the user for controlling the speaker 17, by the controller 9, with a digital signal generated from the associated playback file.

The communication module 29 may also be configured to emit the instructions for modifying the sound volume level to the digital piano 1 for controlling, by the controller 9, the sound volume of the speaker 17 to reach the sound volume level desired by the user.

The memory 31 is configured to store instructions, the implementation of which, by the processor 33, results in the operation of the processing unit 27.

The memory 31 is typically a non-transitory computer-readable storage medium storing a computer program comprising the instructions intended to be executed by the processor 33.

Moreover, the memory 31 may also store a history of the user account, i.e. a list of identifiers of playback files to which the user of the mobile terminal 5 has accessed.

A method for operating the digital piano 1 in the live playing mode will now be described with reference to FIG. 2, the live playing mode is controlled by the controller 9.

In an operation 200, the user plays digital piano 1. The play involves pressing a sequence of keys of the keyboard 7. Pressing a key results in the generation of a characteristic electrical signal. All electrical signals generated by the keyboard 7 make up a music playing signal transmitted in real-time to the controller 9.

Upon reception of the music playing signal, the controller 9 completes two clearly distinct tasks. The first task involves the implementation of an operation 210 and of an operation 220. The second task involves the implementation of an operation 230 and of an operation 240. These two tasks may be implemented simultaneously or sequentially.

As regards the first task, during the operation 210, the controller 9 generates a digital signal from the received music playing signal. In the case where the digital piano 1 uses a sound sampling technology, the controller 9 is capable, for each electrical signal received from the keyboard 7, to retrieve from the memory 19 the sample or the combination of corresponding digital signal samples. The retrieved digital signal samples together form a digital signal, or more exactly a digital audio signal.

During the operation 220, the controller 9 controls the speaker 17 with the digital signal generated from the music playing signal received from the keyboard 7.

Referring to the example of FIG. 1, the digital signal generated by the controller 9 is converted by the digital-to-analog converter 13 into an analog signal, or more exactly one analog audio signal.

Afterwards, the analog signal at the output of the digital-to-analog converter 13 is amplified by the audio amplifier 15 in order to obtain a sufficient power to operate the speaker 17.

Finally, the speaker 17 produces a music sound signal from the amplified analog signal at the output of the amplifier 15. The music sound signal may be reproduced by several speakers such as the speaker 17.

Considering now the second task, during the operation 230, the controller 9 generates a playback file from the music playing signal. The playback file enables the deferred reproduction of the digital signal generated during the operation 210.

For example, the controller 9 detects in real-time pressing of a key of the keyboard 7 and measures the duration elapsed between two consecutive presses. The controller 9 generates a playback file corresponding to a music playing signal preceded by a first time period having a duration longer than a predetermined duration and during which no press is detected and followed by a second time period of the same nature, i.e. the next time period having a duration longer than the predetermined duration and during which no press is detected. The controller 9 generates a playback file corresponding to the music playing signal thus identified.

During the operation 240, the controller 9 stores the playback file in a storage portion remote from the memory. The playback file is stored in association with a playback file identifier and, advantageously, with a user account identifier.

As explained before, the memory actually has at least one remote storage portion herein corresponding to the remote server 3, and, optionally, a local storage portion herein corresponding to the memory 11 of the digital piano 1.

Thus, the controller 9 communicates with the remote server 3 via the wide area network RES1 and emits to the remote server 3 each playback file generated in association with the corresponding playback file identifier. Advantageously, the emitted playback file is also associated with the corresponding user account identifier. For example, the emission of each playback file is implemented by the communication module 23.

The remote server 3 stores each playback file received in association with the corresponding playback file identifier and, possibly, the user account identifier.

Still during the operation 240, the controller 9 could also store each playback file in the local storage portion of the memory, i.e. herein the memory 11 when the digital piano 1 is provided with it. Indeed, the controller 9 has direct access to this memory and stores therein each playback file in association with the playback file identifier and, possibly, the user account identifier.

The storage of the playback file in the memory, whether in the remote server 3 or in the memory 11, enables the digital piano 1 to operate in the playback mode.

A method for operating the digital piano 1 in the playback mode will now be described with reference to FIG. 3. The playback mode is controlled by the controller 9.

In the context of the playback mode, the user of the mobile terminal 5 wishes to remotely control the digital piano 1. To do so, the user launches the mobile application on the user interface 25. The user is provided with a user account, with which a user account identifier is associated. The user account is associated and synchronised with the digital piano 1.

In an operation 300, the user of the mobile terminal 5 selects a playback file. The playback files available and displayed on the user interface 25 correspond to playback files stored on the remote server 3 and associated with the user account identifier.

The processing unit 27 accesses this list by establishing a communication with the remote server 3 via the wide area network RES1. For example, the communication module 29 exchanges in real-time or at regular time intervals with the remote server 3 to update the list of available playback files. Moreover, in the context of sharing with another user, the list of available playback files may also comprise playback files associated, within the remote server 3, with a third-party user account identifier.

In an operation 310, the processing unit 27 generates instructions comprising an identifier of the selected playback file. The identifier of the playback file is supplied to the processing unit 27 by the remote server 3 in response to the selection, by the user of the mobile terminal 5, of the corresponding playback file.

In an operation 320, the processing unit 27 emits the instructions comprising the identifier of the selected playback file to the digital piano 1. For example, the instructions are emitted by the communication module 29 via the local network RES2. Alternatively, the communication module 29 may also emit the instructions to the digital piano 1 via the wide area network RES1.

In an operation 330, the instructions comprising the identifier of the playback file are received by the controller 9. For example, the instructions are received by the communication module 23.

It should be noted that the previously-described operations 300 to 330 may also relate to the selection, by the user, of a sound volume level of the speaker 17. In such a case, the processing unit 27 generates instructions comprising the desired sound volume level and emits the instructions to the digital piano 1 for controlling, by the controller 9, the sound volume of the speaker 17 to reach the desired sound volume level.

In an operation 340, the controller 9 determines whether the playback file associated with the playback file identifier is stored in the local storage portion of the memory, i.e. the memory 11, from the received playback file identifier. For example, the controller 9 sequentially compares the playback file identifier with all of the playback file identifiers stored in the memory 11 until establishing a correspondence, or not.

Figure 3:
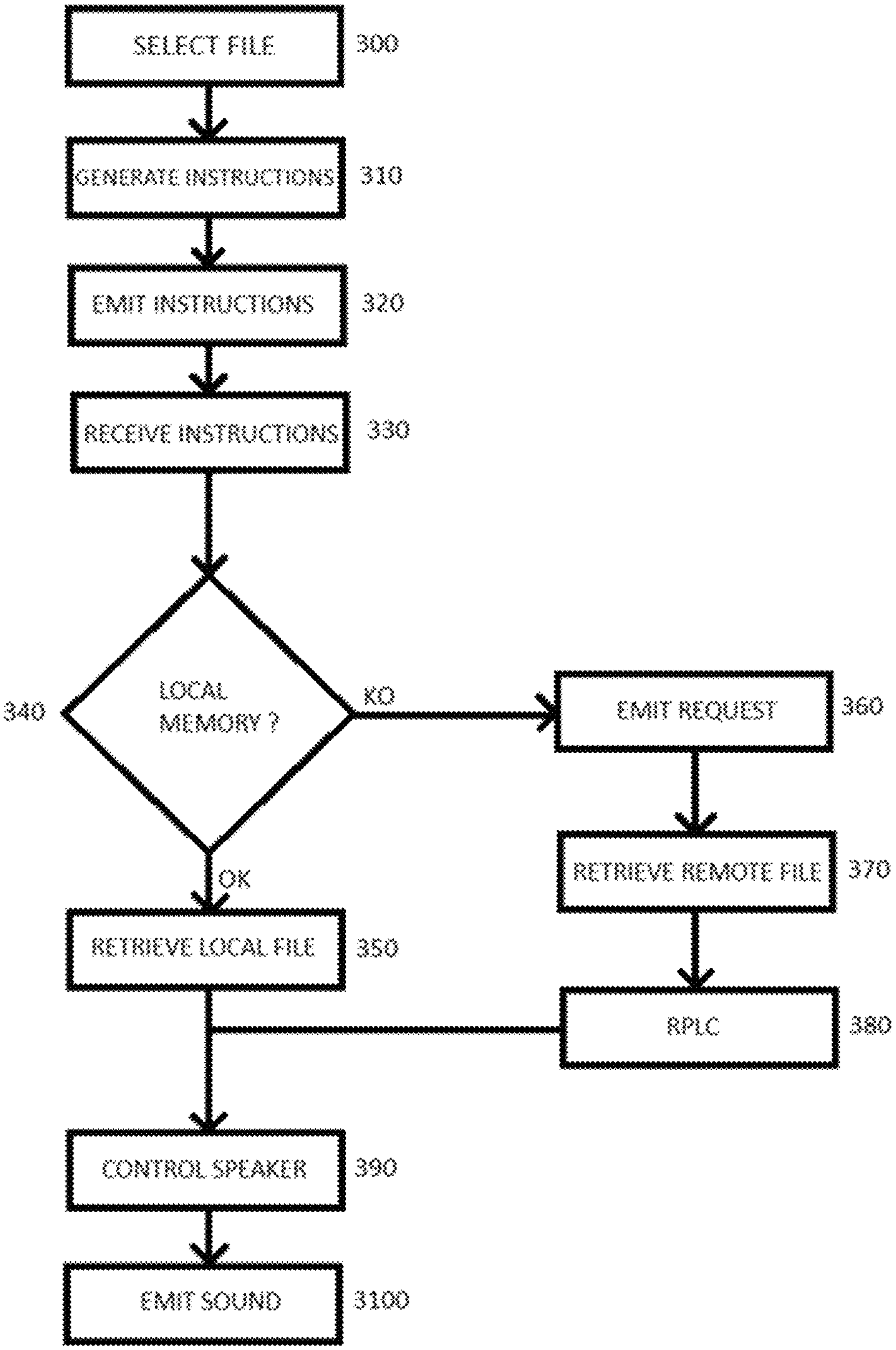
FIG. 3 illustrates a method for operating the digital piano in a playback mode.

As illustrated in FIG. 3, in the case where the corresponding playback file is stored in the memory 11, the controller 9 retrieves therein the playback file in an operation 350.

Otherwise, i.e. when the corresponding playback file is not stored in the local storage portion of the memory, the controller 9 uses the remote storage portion of the memory, namely the remote server 3.

Thus, in an operation 360, the controller 9 generates a request comprising the playback file identifier. Afterwards, the controller 9 sends this request to the remote server 3. For example, the communication module 23 communicates with the remote server 3 via the wide area network RES1 and transmits the request thereto.

In an operation 370, the remote server 3 receives the request emitted by the controller 9. The remote server 3 extracts the playback file identifier from the request and retrieves the corresponding playback file. Afterwards, the remote server 3 transmits the playback file to the controller 9. The controller 9 retrieves the playback file in streaming.

Optionally, during a step 380, the playback file received from the remote server 3 is stored in the local storage portion of the memory, and therefore the memory 11. Indeed, a playback file requested by the user of the mobile terminal 5 is likely to be requested again, in which case it is advantageous for the latter to be already stored in the memory 11 to avoid having to communicate again with the remote server 3.

Nonetheless, the memory 11 may be already full, so that a playback file should be deleted from the memory 11 in order to be able to store the retrieved playback file therein. Advantageously, a time marker is associated with each playback file. Thus, in the playback mode, the controller 9 stores the retrieved playback file as a replacement for the playback file having the earliest time marker in the local storage portion of the memory, and therefore the memory 11, when the latter is full.

As mentioned before, the memory may comprise only a remote storage portion, in which case the memory 11 is absent from the digital piano 1. It may be advantageous for the user that the mobile terminal 5 controls the digital piano 1 not directly by establishing a communication between the processing unit 27 and the controller 9 but throughout the remote server 3. In such a case, inter alia, the mobile terminal 5 communicates with the remote server 3, via the wide area network RES1, and transmits thereto the instructions comprising the selected playback file identifier. The remote server 3 extracts the identifier, retrieves the corresponding playback file and transmits it to the digital piano 1.

In an operation 390, the controller 9 controls the speaker 17 with a digital signal generated from the retrieved playback file.

Figure 2:
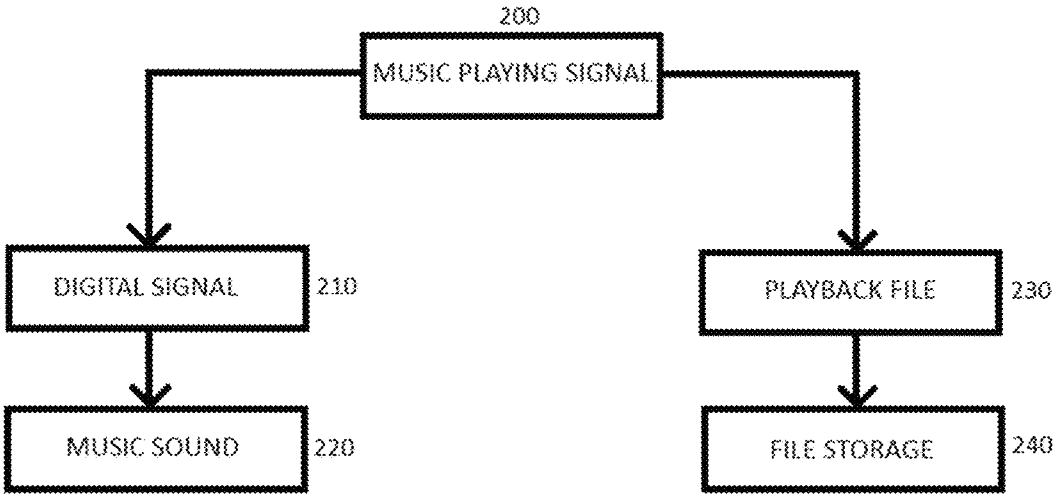
FIG. 2 illustrates a method for operating the digital piano in a live playing mode.

In the same manner as during operation 220 of the live playing mode illustrated in FIG. 2, the digital signal, or more exactly the digital audio signal, generated by the controller 9 is converted by the digital-to-analog converter 13 into an analog signal, or more exactly an analog audio signal.

Afterwards, the analog signal at the output of the digital-to-analog converter 13 is amplified by the audio amplifier 15 in order to obtain enough power to operate the speaker 17.

Finally, in an operation 3100, the speaker 17 produces a music sound signal from the amplified analog signal at the output of the amplifier 15. Herein again, the music sound signal may be reproduced by several speakers such as the speaker 17.

It should be understood that the controller 9 may also be configured to control the digital piano 1 according to a hybrid playing mode combining the live playing mode and the playback mode described before. Such a playing mode is particularly interesting for producing a music sound signal requiring playing with four hands on the keyboard 7. In such a case, the user can, in a first step, play a partition of the music with two hands to generate a playback file from the corresponding music playing signal. In a second step, the mobile terminal 5 may be used by another user to select this playback file and remotely control the reproduction of the corresponding music sound signal whereas the user of the digital piano 1 simultaneously plays the other partition of the music with two hands. The digital piano 1 then operates according to the hybrid mode, so that the controller 9 controls the speaker 17 for the joint reproduction of the music sound signal corresponding to the music playing signal received from the keyboard 7 and the music sound signal corresponding to the playback file.

The invention claimed is:

1. A digital piano, comprising:

a keyboard configured to generate a music playing signal, at least one speaker configured to produce a music sound signal, a controller configured to control the production of the music sound signal by the at least one speaker, and a memory accessible by the controller, wherein the controller is configured to control the digital piano at least according to a live playing mode and a playback mode, the controller being configured, in the live playing mode, to control the at least one speaker with a digital signal generated from the music playing signal received from the keyboard, to generate a playback file from said music playing signal and enabling a deferred reproduction of said digital signal, and to store said playback file in a remote storage portion of the memory, the controller being configured, in the playback mode, to receive a playback file identifier, to access said memory and retrieve the associated playback file therein, and to control the at least one speaker with a digital signal generated from the associated playback file, wherein the keyboard comprises a plurality of keys, wherein the controller is configured to detect the press of a key of said keyboard and to measure an elapsed time without key presses, and wherein the music playing signal from which the playback file is generated is delimited by two time periods without key presses and having a duration longer than a predetermined duration.

* * * * *